Aug. 23, 1955  J. HERBERT  2,715,821
EAR-ORNAMENT CLAMP
Filed Nov. 1, 1954
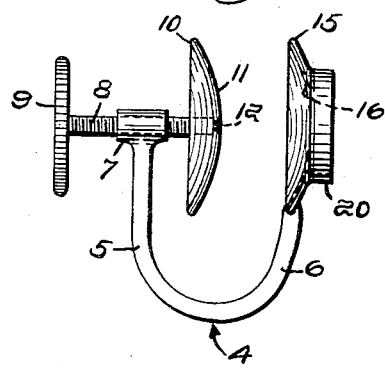
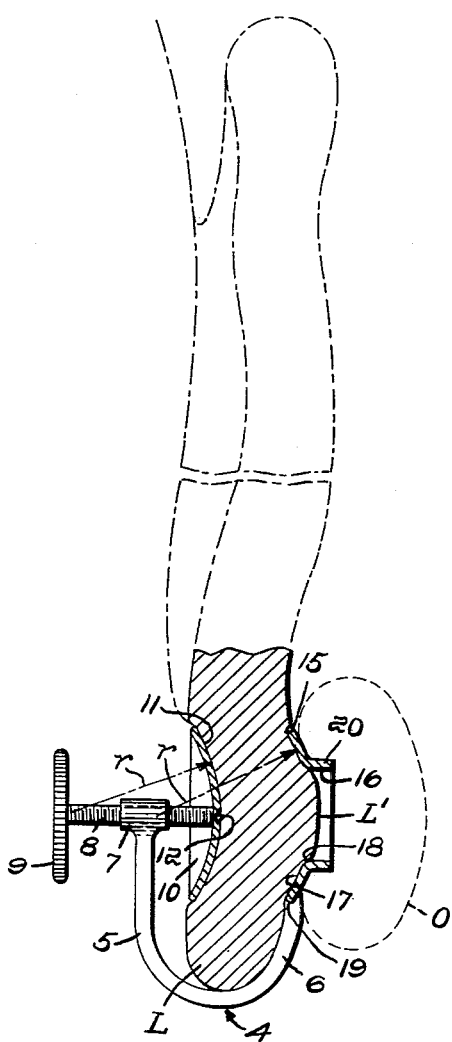
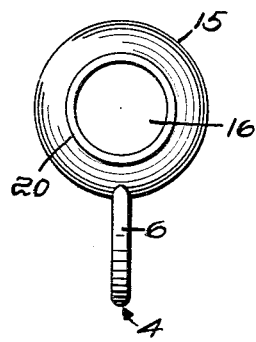
Inventor:
Jacob Herbert,
By Emery, Booth, Townsend, Miller & Weidner
Attys United States Patent Office 2,715,821
Patented Aug. 23, 1955

2,715,821

EAR-ORNAMENT CLAMP

Jacob Herbert, Lawrence, Mass.

Application November 1, 1954, Serial No. 466,101

2 Claims. (Cl. 63—14)

My present invention relates to jewelry, more particularly ear ornaments and especially those for wear on non-pierced ears. It aims to provide an ear-ornament support and attaching device herein termed an ear-ornament clamp or lobe-locking holder, novelly constructed, proportioned and arranged to avoid discomfort to a wearer yet to afford such secure positive attachment to a non-pierced ear lobe as to be substantially proof against loss therefrom.

In the drawings, illustrating one embodiment of the invention:

Fig. 1, partly in elevation and partly in section, shows the improved ear-ornament clamp in use position on the ear lobe of a wearer;

Fig. 2 is a full elevational view of the clamp of Fig. 1 by itself and in similar position, with the ornament proper or jewel omitted; and Fig. 3 is an outer end or side elevation of the clamp, demounted, looking from the right onto Fig. 2.

In the illustrative embodiment my novel ear clamp comprises a generally U-shaped yoke 4 having inner and outer legs 5 and 6. At the free or upper end of the inner leg 5 the usual threaded sleeve 7 receives a like-threaded adjustable clamping screw 8 having a manipulating head 9.

At the end of the screw 8 within the yoke 4 there is provided a dome-like clamp shoe 10 in the form of a generally circular disc with a markedly convex parti-spherical face 11 at the side which is to engage the wearer's ear lobe L, Fig. 1. This shoe is of a relatively large diameter substantially greater than that of the screw 8, and of the order of at least ¼ in. for the average adult size. The inner shoe face 11 is curved symmetrically about the screw 8 central thereof and presents an extensive convex area for engagement against and gentle thrusting entrant seating upon the ear lobe, with a uniform distribution of pressure over the entire dome-like face.

At the other face, that toward the manipulating end of the screw 8, the shoe 10 is centrally secured to the inner end of the screw. While any suitable form of connection 12 may be employed, preferably it is such as to permit relative rotation as between the screw 8 and the shoe 10, so that the latter may stand in non-rotative engagement with an ear lobe L when the screw is being turned in or out to clamp or to release the device. One form of such movable connection 12 as shown in Figs. 1 and 2 by way of example comprises a small flanged axial post at the end of the screw 8 and rotatively received in an apertured recess at the center of the shoe 10. Such connection desirably also and as shown permits the flat-domed clamp shoe 10 to tilt somewhat relative to the screw 8 for comfortable conformance to the ear lobe L.

For cooperation with the shoe 10 the outer leg 6 of the yoke 4 has fixed at the free or upper end thereof a concave clamp ring 15 of an overall outer diameter commensurate with that of the shoe 10 and constituting therewith a conformant parallel lobe-clamping pair. This ring 15 is disposed concentrically opposite the shoe 10. It has a large central aperture 16 the center of which is in line with the center of the convex face 11 of the shoe 10. Such central aperture 16 is of a substantial area, much greater than that of a cross-section of the screw 8. It affords a positive lobe-receiving and seating recess of at least about one-third the outer diameter of the ring 15 as a whole and in the illustrated example approximately one-half thereof. So in the average construction having the shoe 10 and the ring 15 of the clamp pair each of an outer diameter of ¼ to 5/16 in. the diameter of the ring seating aperture 16 is at least ⅛ in.

Accordingly, in the installed Fig. 1 position of the device, the ring 15 has the capacity to receive and seat a corresponding flat projected mass or shallow plug or button L' of the wearer's ear lobe L. Hence as the screw 8 is turned to move the clamp shoe 10 toward the ring 15, with an ear lobe L interposed between them, a button-like portion L' of the fleshy substance of the ear lobe is carried outward by the gentle clamping action and into positive seated relation in the socket provided by the ring and the aperture 16 thereof, as indicated in Fig. 1. Desirably both the inner and the outer marginal edges 18, 19 of the clamp ring 15 are slightly rounded as shown and likewise the outer marginal edge of the shoe 10. By reason of the construction, oppositely centered arrangement and proportioning of the shoe and ring members 10, 15 the flesh of the ear lobe is in effect caused to flow uniformly into the seating socket of the ring aperture 16 from the surrounding zone of the lobe around the aperture and at and adjacent the engaged region between the shoe 10 and the marginal portion of the ring 15.

Further, the surrounding band or ring part proper of the clamp ring 15 in its entirety is dished or concaved at least at the inner face 17 thereof, Fig. 1, conformantly to the opposite convex face 11 of the shoe 10. Said inner face 17 of the marginal or solid portion of the ring 15 is itself of substantial width radially, as illustrated. This parallel convexo-concave domed and dished relation of the shoe 10 and the ring 15 is indicated on Fig. 1 by the two equal radii $r, r$ respectively drawn from the centers of curvature of said two parts of this pair. Hence under the clamping action the said two faces 11 and 17 are truly parallel and equi-spaced at all opposed points thereon when the shoe 10 is perpendicular to the screw 8, as it is on any normal ear lobe. Thus attendant on positive seating of a projective flat button portion L' of the ear lobe L into the central aperture 16 of the ring 15, the shoe 10 receives a self-centering and circumferentially matching pressure-distributing position with respect to the ring 15. Hence with the device installed as in Fig. 1 there is no point-pinching of the lobe but merely a uniform pressure spread over the entire and substantial clamped area thereof. At the same time the button-projecting seating engagement of the clamp pair 10 and 15 reduces to the minimum any opportunity for inadvertent sliding or slippage of the device with respect to the wearer's ear.

The pressure-distributing dome and ring clamp device of the described invention is adapted for use with ornaments of the lateral or attached jewel type, indicated diagrammatically by the dotted showing at $o$ in Fig. 1, or of the pendant variety. For such jewel ornaments the outer face of the clamp ring 15, which may be convex, flat or otherwise formed, is provided with any suitable anchor or attaching means such as a flange 20 circumferentially continuous or otherwise, to which the ornament may be soldered, riveted or otherwise affixed. Obviously ornaments of the pendant type may be hung on the yoke 4 in any preferred manner, as at the closed bottom or connecting portion or otherwise located thereon.

The novel ear ornament clamp of the present invention has in actual use been proven to afford maximum comfort to the wearer and substantially complete insurance against accidental loss of the ear ornament in the course of wearing.

Attached hereto as a part of this application is a specimen of the device of the drawings.

My invention is not limited to the particular embodiment thereof illustrated and described herein, and I set forth its scope in my following claims.

I claim:

1. An ear-ornament lobe-locking holder comprising a U-shaped yoke to straddle an ear lobe and having outer and inner legs, a securing screw having threaded support on the inner yoke leg, a generally circular shoe concentrically carried at the end of the screw between the yoke legs and having an extensive shallow dome-like convex face to engage entrantly with an ear lobe, and on the outer yoke leg a ring comprising a marginal ring portion with an inner face of substantial and uniform radial width concaved conformantly to the convexity of the opposite shoe face and enclosing a wide central aperture with a rounded margin for easy flow of ear-lobe substance into the aperture under mutual approach of the shoe and ring, the outer diameter of the ring approximately matching that of the shoe and the inner diameter of the ring at the aperture being at least about one-third of said outer diameter but sufficiently less than the latter to provide said wide concaved inner face for the marginal ring portion, said ring disposed in axial line with the shoe and presenting opposite the latter a coaxial seating socket for flow reception and retention of a positive plug-like shallow projective button of the wearer's fleshy ear-lobe substance under the gently thrusting and pressure-distributing action of the convex shoe toward the ring in the installed position of the holder.

2. An ear-ornament lobe-locking holder according to claim 1 wherein the shoe and the ring each have an outer diameter of at least 5/16 in.

References Cited in the file of this patent

UNITED STATES PATENTS

| | | |
|---|---|---|
| 1,174,174 | Markham | Mar. 7, 1916 |
| 2,034,503 | Barnes | Mar. 17, 1936 |
| 2,432,763 | Ilsen | Dec. 16, 1947 |
| 2,557,200 | Pujol | June 19, 1951 |